F. E. SCHWENTLER.
AUTOMATIC ADJUSTING DEVICE FOR BRAKE HEADS.
APPLICATION FILED SEPT. 16, 1914.

1,199,932.

Patented Oct. 3, 1916.
2 SHEETS—SHEET 1.

WITNESSES
J. Snowden Bell
A. B. Fowler

INVENTOR
Francis E. Schwentler
BY Edward Wright
ATTORNEY

F. E. SCHWENTLER.
AUTOMATIC ADJUSTING DEVICE FOR BRAKE HEADS.
APPLICATION FILED SEPT. 16, 1914.
1,199,932.
Patented Oct. 3, 1916.
2 SHEETS—SHEET 2.
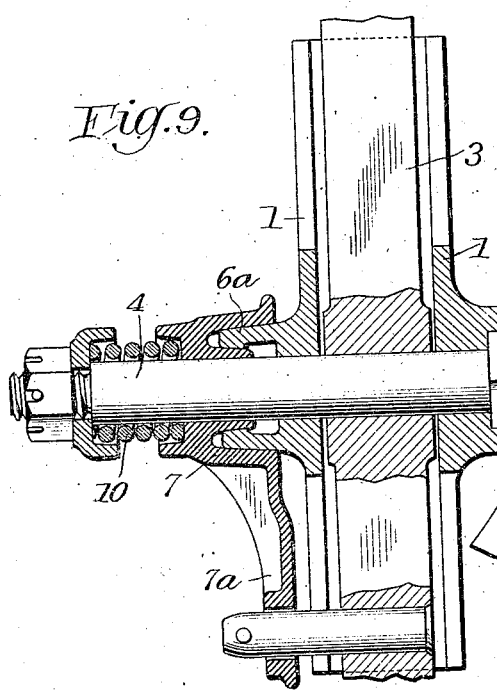
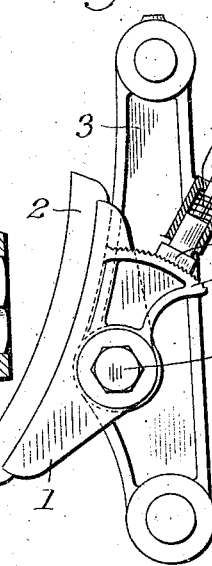
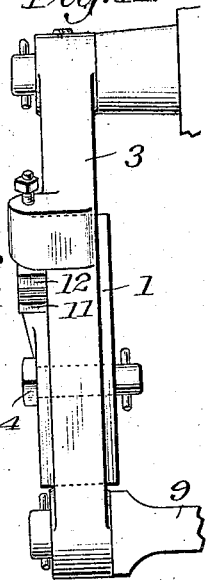
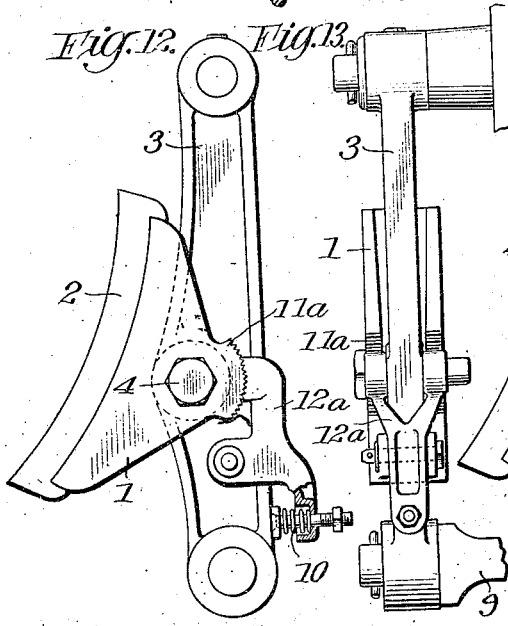
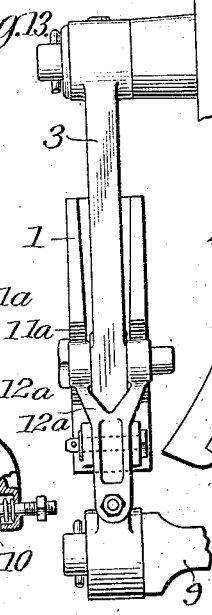
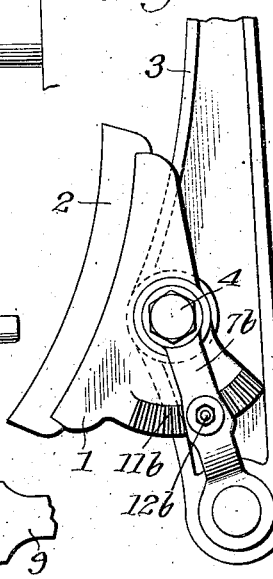
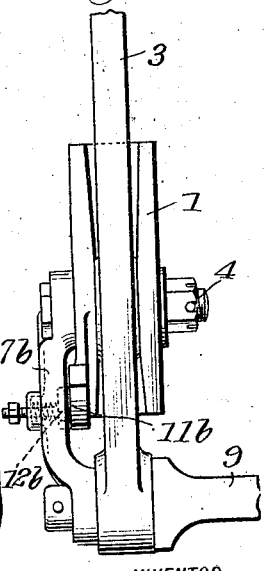
INVENTOR
Francis E. Schwentler
BY
Edward Wright
ATTORNEY
WITNESSES

UNITED STATES PATENT OFFICE.

FRANCIS E. SCHWENTLER, OF ST. LOUIS, MISSOURI, ASSIGNOR TO AMERICAN BRAKE COMPANY, OF ST. LOUIS, MISSOURI, A CORPORATION OF MISSOURI.

AUTOMATIC ADJUSTING DEVICE FOR BRAKE-HEADS.

1,199,932.  Specification of Letters Patent.  Patented Oct. 3, 1916.

Application filed September 16, 1914. Serial No. 861,969.

*To all whom it may concern:*

Be it known that I, FRANCIS E. SCHWENTLER, a citizen of the United States, and a resident of St. Louis, in the State of Missouri, have invented a certain new and useful Improvement in Automatic Adjusting Devices for Brake-Heads, of which improvement the following is a specification.

This invention relates to brake heads and hanger levers, and has for its object to provide an improved connecting means therefor, whereby the brake head and shoe may be automatically adjusted upon its pivot on the hanger to a position concentric with the periphery of the wheel, and be retained in such position until again shifted by engagement with the wheel.

Figure 1:
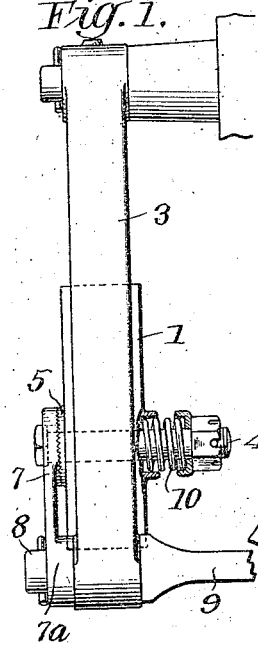
Figure 2:
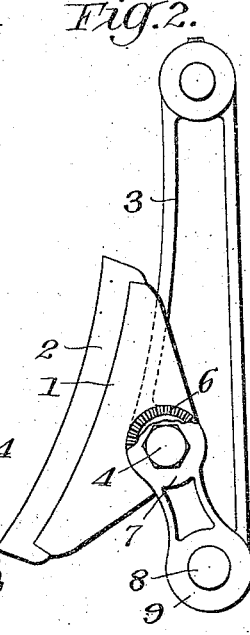
Figure 3:
Figure 4:
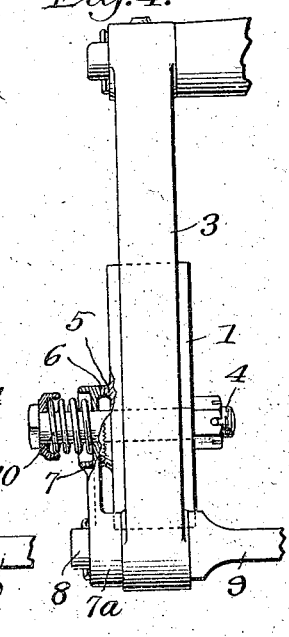
Figure 5:
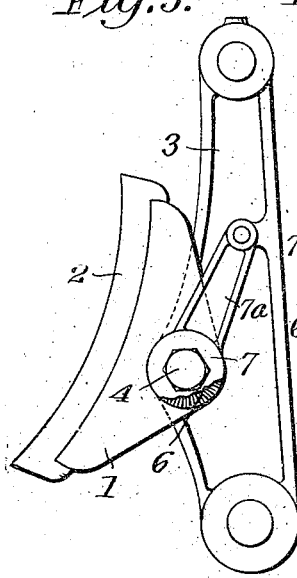
Figure 6:
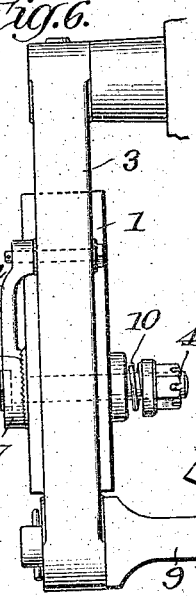
Figure 7:
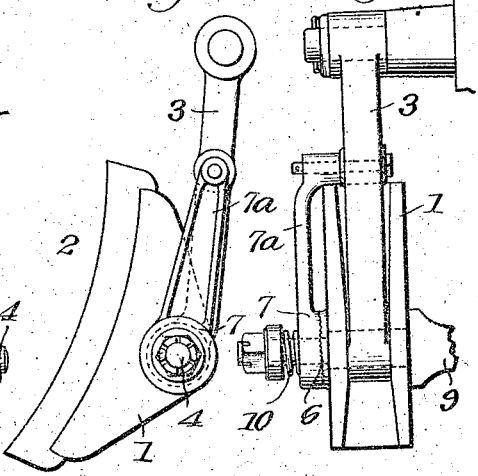
Figure 8:
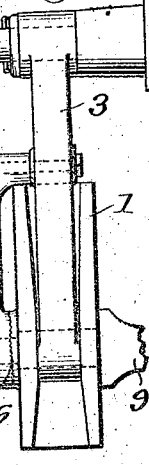

In the accompanying drawings: Figures 1 and 2 illustrate, in end and side elevations, respectively, a brake shoe and hanger with one form of my improved connections; Figs. 3 and 4, similar end views showing slight modifications; Figs. 5 and 6, corresponding side and end views showing another modification; Figs. 7 and 8, similar views showing a further slight modification; Fig. 9, a sectional view showing another modification in which conical friction surfaces are employed; Figs. 10 and 11, a side and an end view, respectively, showing still another modification; and Figs. 12 to 15 inclusive, similar views showing still other modifications.

In the operation of brake shoes as applied to the wheels of railway vehicles it is important that the brake heads and shoes carried thereby should be maintained substantially concentric with the periphery of the wheel when released in order to prevent dragging and to produce substantially uniform pressure and wear upon all parts of the bearing face of the shoe.

According to my improvement, the brake head is pivotally mounted on the hanger or other support with a yielding resistance element connecting the same, whereby the brake head is normally retained in the position to which it is adjusted, but will be readjusted by being turned on its pivot to another position when sufficient force is applied to overcome said yielding resistance, as when the brake shoes are applied to the wheels after the concentric relation has been disturbed.

Various forms of yielding resistance connections may be designed for this purpose, but I prefer a construction in which the respective parts are provided with engaging friction surfaces, either smooth, rough or serrated, with means for holding said surfaces in engagement with each other under a yielding pressure.

According to the construction shown in Figs. 1 and 2, the brake head, 1, having side flanges and carrying the shoe, 2, is pivotally mounted on the hanger, 3, by means of the pin, 4, and is provided with a hub portion, 5, having a serrated friction surface, 6, adapted to engage a corresponding serrated friction face on the resistance arm, 7. In this instance, the serrations are substantially radial with reference to the supporting pin, and the resistance arm is prevented from turning relative to the hanger by an extension, 7ª, mounted on the trunnion, 8, of the brake beam, 9.

The serrated friction surfaces are held in engagement with each other under yielding pressure by means of the coiled spring, 10, mounted on the pin at the other side of the hanger. The spring is of suitable strength to produce sufficient resistance between the engaging surfaces to normally hold the brake head in its adjusted position relative to the hanger, but is adapted to yield and permit the serrated surfaces to slide upon each other when further adjustment is effected by the application of the brake shoes to the wheels.

As shown in Fig. 4, the coiled spring, 10, is located on the same side of the brake head as the serrated resistance surface, while in Fig. 3, a flat cambered spring, 10ª, is employed in the place of a coiled spring. The extension of the resistance arm may be secured to the hanger at any suitable point, as indicated in Figs. 5 to 8, and if the brake head is mounted on the brake beam trunnion, the resistance arm and spring may also be applied thereto, as shown in Figs. 7 and 8.

According to the modification shown in Fig. 9, smooth conical frictional surfaces, 6ª, are employed in place of the serrated frictional surfaces, the spring, 10, acting to force the tapered or conical hub portions together. As shown in Figs. 10 and 11, the serrated resistance surface is formed on the sector, 11, of the brake head, and is engaged by the spring actuated plunger, 12, mounted on the hanger. In the modification shown in Figs. 12 and 13, a pivoted lever or pawl, 12ª, actuated by spring, 10, is employed for engaging the serrated surface on the sector, 11ª, of the brake head. In the construction shown in Figs. 14 and 15, the serrated sector, 11ᵇ, is located on the outside of the brake head, and is engaged by a spring actuated plunger, 12ᵇ, mounted on the arm, 7ᵇ.

In all of these constructions it will be seen that the principle of operation is substantially the same, the yielding resistance being so determined by the strength of the spring that when the brake shoes are set against the wheels by an application of the brakes, the engaging resistance surfaces will be caused to slide upon each other if adjustment is necessary to bring the shoe into a position concentric to the periphery of the wheel. The yielding resistance then serves to hold the brake head in its adjusted position relative to the hanger, but need be only sufficient to overcome the unbalanced weight of the head and shoe and prevent the parts from being disturbed from this position by the usual vibration and jolts produced in the running of the train.

Having now described my invention, what I claim as new and desire to secure by Letters Patent is:

1. The combination of a brake hanger, a brake head pivotally supported thereon and having a friction surface separate from the pivot bearing, a movably mounted resistance member having a corresponding friction surface, a connection between the hanger and said friction member to prevent movement of the latter with the brake head, and means for forcing said friction surfaces into engagement with each other.

2. The combination of a brake hanger, a brake head pivotally supported thereon and having a friction surface separate from the pivot bearing, a resistance arm mounted on said pivot and having a corresponding friction surface, a connection between the hanger and said arm, and a spring for forcing said friction surfaces into engagement with each other.

3. The combination of a support, a brake head pivotally mounted thereon and having a serrated resistance surface, a resistance member movably mounted on said support and having a corresponding serrated surface and a spring for forcing said serrated surfaces into engagement with each other.

4. The combination of a brake hanger, a brake head pivotally mounted thereon, and having a hub provided with a resistance surface around said pivot, a resistance arm having a corresponding surface, and a spring for forcing said surfaces into engagement with each other.

5. The combination of a brake hanger, a brake head, a supporting pin, said brake head having a frictional resistance surface around said pin, a resistance arm mounted on said pin and having a corresponding friction surface, and a spring for forcing said surfaces into engagement with each other.

6. The combination of a brake head having side flanges, a hanger between said flanges, a pin passing through the same, the brake head having a friction surface, a friction member also mounted on said pin and having a corresponding friction surface, and means for forcing said friction surfaces into engagement with each other.

7. The combination of a brake head having side flanges, a hanger between said flanges, a pin passing through the same, the brake head having a friction surface, a resistance arm mounted on said pin and having a friction surface, a connection from said arm to the hanger, and a spring for forcing said friction surfaces into engagement with each other.

FRANCIS E. SCHWENTLER.

Witnesses:
ALEX STEINER,
OTTO J. PAPKE.